(12) United States Patent
Iwase et al.

(10) Patent No.: US 8,508,086 B2
(45) Date of Patent: Aug. 13, 2013

(54) COOLING STRUCTURE OF ROTATING ELECTRICAL MACHINE

(75) Inventors: Yuji Iwase, Mishima (JP); Shinichi Baba, Susono (JP); Yosuke Kato, Gotemba (JP); Kouhei Miyake, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 200 days.

(21) Appl. No.: 13/119,102

(22) PCT Filed: Aug. 30, 2010

(86) PCT No.: PCT/JP2010/064741
§ 371 (c)(1),
(2), (4) Date: May 4, 2011

(87) PCT Pub. No.: WO2012/029112
PCT Pub. Date: Mar. 8, 2012

(65) Prior Publication Data
US 2012/0049667 A1 Mar. 1, 2012

(51) Int. Cl.
*H02K 9/00* (2006.01)
(52) U.S. Cl.
USPC .................................. 310/54; 310/52; 310/59
(58) Field of Classification Search
USPC ........................................................ 310/52–59
See application file for complete search history.

(56) References Cited

U.S. PATENT DOCUMENTS

| | | | |
|---|---|---|---|
| 6,727,611 B2 * | 4/2004 | Bostwick | 310/58 |
| 6,933,633 B2 * | 8/2005 | Kaneko et al. | 310/52 |
| 7,675,209 B2 * | 3/2010 | Masoudipour et al. | 310/89 |
| 7,952,240 B2 * | 5/2011 | Takenaka et al. | 310/54 |
| 8,093,770 B1 * | 1/2012 | Berhan | 310/54 |
| 8,169,110 B2 * | 5/2012 | Swales et al. | 310/54 |
| 2010/0033039 A1 * | 2/2010 | Sakai et al. | 310/54 |
| 2010/0045125 A1 * | 2/2010 | Takenaka et al. | 310/54 |
| 2010/0264759 A1 * | 10/2010 | Shafer et al. | 310/54 |
| 2012/0313465 A1 * | 12/2012 | Prix | 310/54 |

FOREIGN PATENT DOCUMENTS

| | | |
|---|---|---|
| JP | 06-099745 A | 4/1994 |
| JP | 08-130856 A | 5/1996 |
| JP | 2001-268849 A | 9/2001 |
| JP | 2008-206213 A | 9/2008 |

* cited by examiner

*Primary Examiner* — Thanh Lam
(74) *Attorney, Agent, or Firm* — Sughrue Mion, PLLC

(57) ABSTRACT

A cooling structure includes a rotating electrical machine (1) that has a stator (3), the stator including plural split cores (4) annularly combined, and a shrink-fitted ring (5) mounted to the outer periphery of the plural split cores (4) for integrating the plural split cores (4), and a case (10) that accommodates the rotating electrical machine (1) therein, the shrink-fitted ring (5) includes a cylindrical portion (6), and a flange portion (7) that is provided at one end of the cylindrical portion (6), the case (10) includes an accommodating portion (11) which has an inner peripheral wall (11a) whose inner diameter is larger than the outer diameter of the cylindrical portion (6) and smaller than the outer diameter of the flange portion (7), and in which accommodates the stator (3), a first wall face (12) extending outward in the radial direction from the end of the inner peripheral wall (11a) where the flange portion (7) is arranged, the flange portion (7) being mounted to the first wall face (12), and a second wall face (13) extending inward in the radial direction from the end of the inner peripheral wall (11a).

3 Claims, 2 Drawing Sheets

COOLING STRUCTURE OF ROTATING ELECTRICAL MACHINE

TECHNICAL FIELD

The present invention relates to a cooling structure for cooling a rotating electrical machine having a stator including plural split cores and a fastening member mounted to the outer periphery of the split cores so as to integrate the plural split cores.

BACKGROUND ART

There is known an electric motor having a housing for accommodating a rotor and a stator therein, wherein a water jacket in which a cooling water is circulated is provided at a portion positioned at the outside in the radial direction of the stator in the housing (see Patent Document 1). In addition, Patent Document 2 is another prior art document related to the present invention.

CITATION LIST

Patent Literature

Patent Document 1: JP-2008-206213A
Patent Document 2: JP-06-099745A

SUMMARY OF INVENTION

Technical Problem

In the electric motor described in Patent Document 1, it is necessary to process a water jacket in the wall face of the housing. Therefore, it takes time and labor for the processing, whereby a production cost might be increased.

In view of the foregoing, one object of the present invention is to provide a cooling structure of a rotating electrical machine, wherein a cooling jacket having a cooling liquid fed thereto can be formed with a simpler configuration as compared with a conventional technique.

Solution to Problem

A cooling structure of a rotating electrical machine of the present invention includes a rotating electrical machine that includes a stator, the stator having plural split cores annularly combined, and a fastening member mounted to the outer periphery of the plural split cores for integrating the plural split cores, and a case that accommodates the rotating electrical machine therein, wherein the fastening member includes a cylindrical portion, and a flange portion that is provided to all over circumference at one end of the cylindrical portion in an axial direction and that extends outward in a redial direction from the cylindrical portion, the case includes an accommodating portion which has an inner peripheral wall whose inner diameter is larger than the outer diameter of the cylindrical portion and smaller than the outer diameter of the flange portion, and in which the stator is accommodated such that the inner peripheral wall and the outer peripheral surface of the cylindrical portion oppose to each other, a first wall face extending outward in the radial direction from the end of the inner peripheral wall where the flange portion is arranged, the flange portion being mounted to the first wall face, and a second wall face extending inward in the radial direction from the end of the inner peripheral wall where the other end of the cylindrical portion in the axial direction is arranged, the other end of the cylindrical portion being in contact with the second wall face, and a cooling jacket is formed by the inner peripheral wall of the accommodating portion, the outer peripheral surface of the cylindrical portion, the flange portion, and the second wall face, between the case and the stator, and a cooling liquid is fed to the cooling jacket.

In the cooling structure according to the present invention, the cooling jacket is formed by the inner peripheral wall of the accommodating portion, the outer peripheral surface of the cylindrical portion, the flange portion, and the second wall face. Therefore, it is unnecessary to make a process of forming a space in the outer peripheral wall of the case. Since the inner peripheral wall of the accommodating portion and the stator are not in contact with each other, it is unnecessary to process the inner peripheral wall with high accuracy. As described above, according to the cooling structure of the present invention, the configuration is simplified, whereby time and labor for the processing can be reduced. Accordingly, a production cost can be reduced. Since the oil is directly in contact with the fastening member in the cooling structure described above, heat is easy to be transmitted to the oil from the stator. Therefore, the cooling efficiency of the stator can be enhanced.

According to one embodiment of the cooling structure of the present invention, the cooling liquid is an oil, and the cooling jacket may be provided with a feed path for feeding the oil inside to a coil end of the split core of the stator. In this case, the oil can be fed to a coil end of the split core, whereby the cooling efficiency can further be enhanced.

According to this embodiment, the feed path may be provided by cutting a part of a portion of the flange portion, the part being positioned above the coil end that is the subject to which the oil should be fed. In this case, the processing of the feed path can be made before the rotating electric machine is assembled into the case, whereby time and labor for the processing can be reduced.

DESCRIPTION OF EMBODIMENTS

Figure 1:
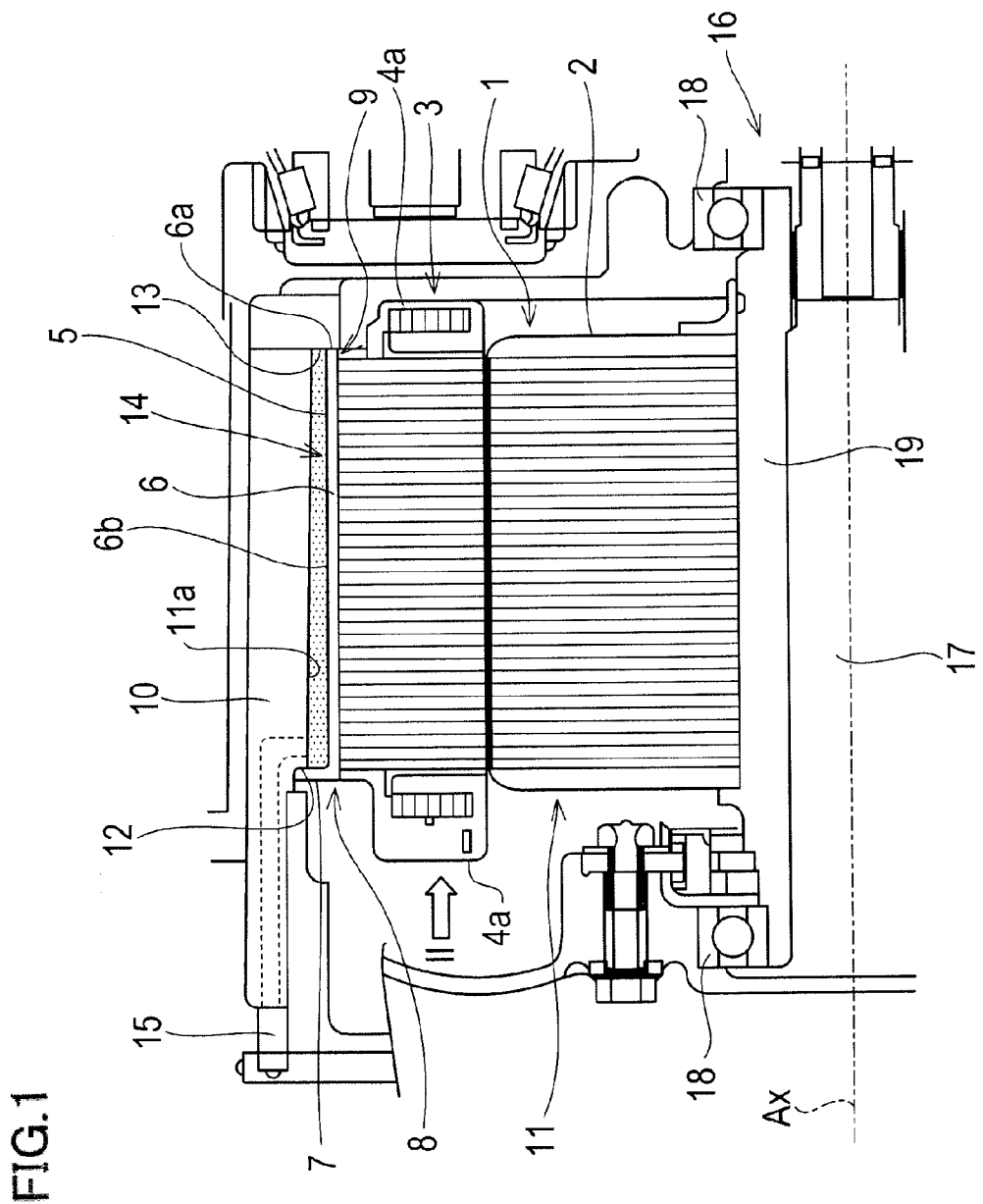
FIG. 1 is a view showing a rotating electrical machine to which a cooling structure according to one embodiment of the present invention is applied.
Figure 2:
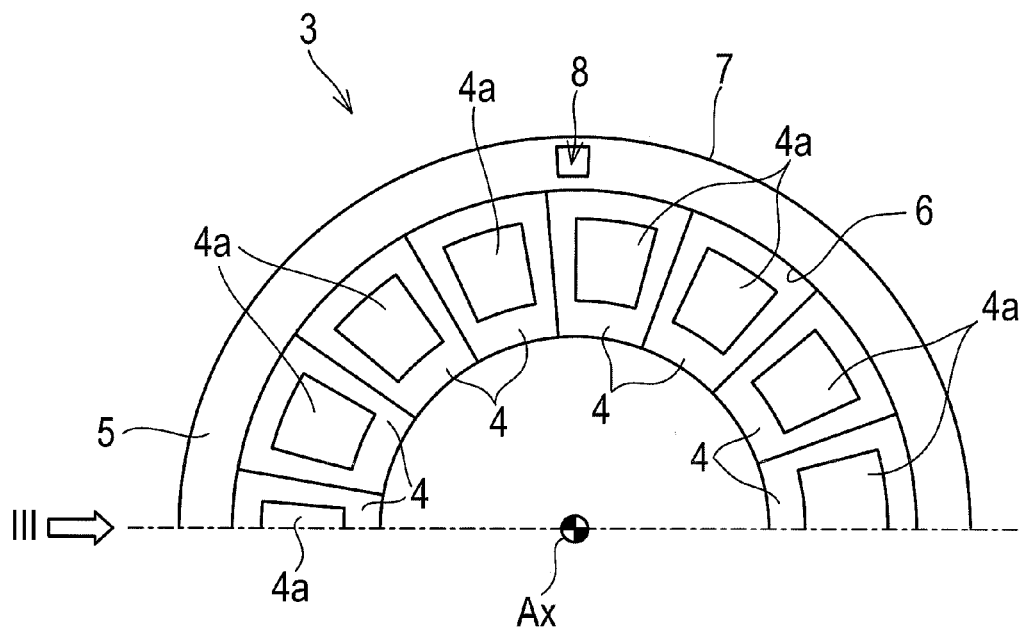
FIG. 2 is a view showing a stator viewed from an arrow II in FIG. 1.
Figure 3:
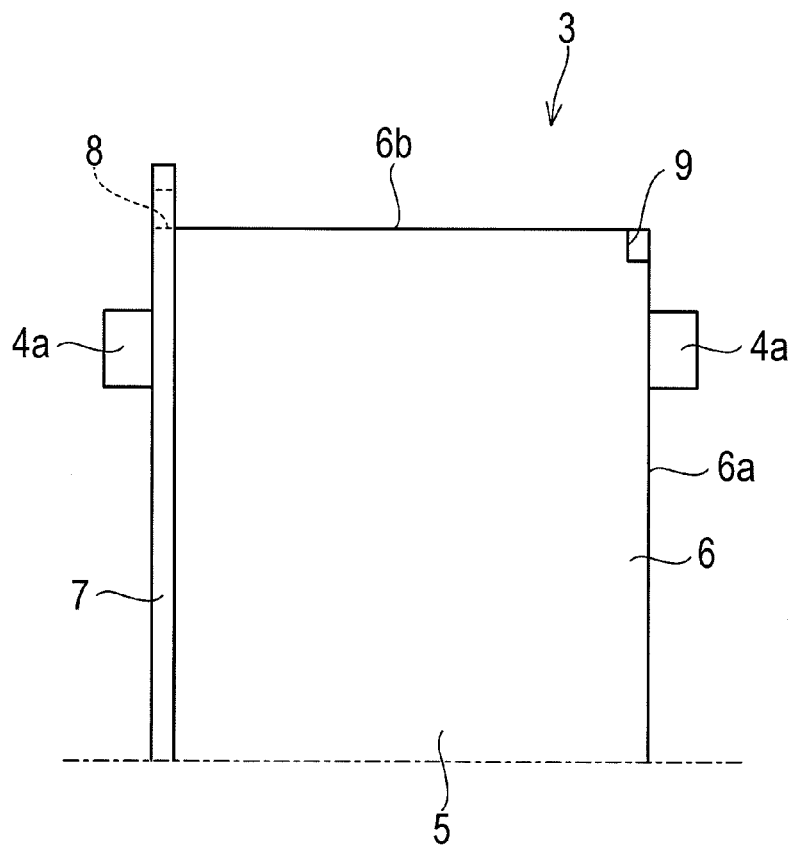
FIG. 3 is a view showing the stator viewed from an arrow III in FIG. 2.

FIG. 1 shows a rotating electrical machine to which a cooling structure according to one embodiment of the present invention is applied. The rotating electrical machine 1 is a motor generator serving as an electric motor and a generator, and it is mounted to a vehicle as a traveling power source. The rotating electrical machine 1 has a rotor 2 and a stator 3. FIG. 2 is a view of the stator 3 viewed from an arrow II in FIG. 1. FIG. 3 is a view of the stator 3 viewed from an arrow III in FIG. 2. As shown in FIG. 2, the stator 3 has plural split cores 4, and a shrink-fitted ring 5 serving as a fastening member for integrating these split cores 4. The plural split cores 4 are annularly combined, and the shrink-fitted ring 5 is mounted at the outer periphery of the split cores 4. The shrink-fitted ring 5 fastens the plural split cores 4 from the outer periphery to integrate the split cores 4. As shown in FIG. 3, the length of the shrink-fitted ring 5 in a direction of an axis Ax is set such that a coil end 4a of each split core 4 protrudes from the shrink-fitted ring 5. The shrink-fitted ring 5 has a cylindrical portion 6 and a flange portion 7 extending outward from the cylindrical portion 6 in a radial direction. The flange portion 7 is provided to all over circumference at one end of the cylindrical portion 6 in the axial direction Ax. As shown in this figure, the flange portion 7 is provided with a cutout portion 8 formed by cutting a part of the flange portion 7. A cutout portion 9 is formed by cutting a part of the cylindrical portion 6 at the other end 6a of the cylindrical portion 6 in the axial direction Ax. The cutout portion 9 is provided so as to lie with the cutout portion 8 of the flange portion 7 in the axial direction Ax. The rotor 2 is the same as a well-known rotor of a motor generator mounted to a vehicle, so that the detailed description will be omitted.

As shown in FIG. 1, the rotating electrical machine 1 is accommodated in a case 10. The case 10 is provided with an accommodating portion 11 that accommodates the rotating electrical machine 1 therein. An inner peripheral wall 11a of the accommodating portion 11 is formed such that the inner diameter thereof is larger than the outer diameter of the cylindrical portion 6 of the stator 3 and smaller than the outer diameter of the flange portion 7. The inner peripheral wall 11a is also formed such that the inner diameter thereof gradually decreases from the side where the flange portion 7 is arranged to the side where the other end 6a of the cylindrical portion 6 in the axial direction Ax is arranged, i.e., from the left side to the right side in FIG. 1. Generally, the case 10 is a foundry piece or a die-cast product. As is well known, a foundry piece is provided with a draft in order to facilitate a removal from a casting mold. The tilt of the inner peripheral wall lla is the draft. The case 10 includes a first wall face 12 extending outward in the radial direction from the end 11b of the inner peripheral wall 11a where the flange portion 7 is arranged, and a second wall face 13 extending inward in the radial direction from the end 11c of the inner peripheral wall 11a where the other end 6a of the cylindrical portion 6 is arranged. As shown in this figure, the first wall face 12 is provided to the case 10 in such a manner that the flange portion 7 of the stator 3 is in contact with the first wall face 12 when the rotating electrical machine 1 is accommodated in the accommodating portion 11. The flange portion 7 is fixed to the first wall face 12 so as not to be capable of rotating. With this structure, the stator 3 is fixed to the case 10. The second wall face 13 is provided to the case 10 in such a manner that the other end 6a of the cylindrical portion 6 of the stator 3 accommodated in the accommodating portion 11 is in contact with the second wall face 13.

The rotating electrical machine 1 is coaxially accommodated in the accommodating portion 11. In this case, the rotating electrical machine 1 is accommodated such that the cutout portions 8 and 9 are arranged at the highest position. Since the rotating electrical machine 1 is accommodated as described above, a cooling jacket 14 is formed by the outer peripheral surface 6b of the cylindrical portion 6, the inner peripheral wall 11a of the accommodating portion 11, the flange portion 7, and the second wall face 13, between the case 10 and the stator 3. The case 10 is provided with an oil feed path 15 for feeding oil, serving as cooling liquid, to the cooling jacket 14. Although not shown, an oil discharge path for discharging oil from the cooling jacket 14 is connected to the cooling jacket 14. When the oil is fed to the cooling jacket 14, the oil is flown out of the respective cutout portions 8 and 9. The flown oil is thrown to the coil end 4a of each split core 4 to cool the coil end 4a. Therefore, these cutout portions 8 and 9 correspond to a feed path according to the present invention.

A power transmission mechanism 16 for transmitting power, outputted from the rotating electrical machine 1, to a wheel is provided in the case 10. The power transmission mechanism 16 includes a first rotating shaft 17 rotatably supported by the case 10 about the axial direction Ax, and a second hollow rotating shaft 19 rotatably supported by the first rotating shaft 17 and a pair of bearings 18 about the axial direction Ax. The rotor 2 of the rotating electrical machine 1 accommodated in the accommodating portion 11 is mounted to the second rotating shaft 19, thereby rotating about the axial direction Ax with being integrated with the second rotating shaft 19.

As described above, in the cooling structure, the cooling jacket 14 is formed by the inner peripheral wall 11a of the accommodating portion 11, the second wall face 13, and the shrink-fitted ring 5. Therefore, there is no need to make a process of forming a space in the outer peripheral wall of the case 10. In this cooling structure, the inner peripheral wall 11a is not in contact with the shrink-fitted ring 5. Therefore, it is unnecessary to process the inner peripheral wall 11a with high processing accuracy. When the rotating electrical machine 1 is accommodated in the case 10 without forming a gap, the inner peripheral wall 11a has to be processed with high accuracy after the casting in order to remove the draft of the case 10. On the other hand, in the present invention, the rotating electrical machine 1 is not in contact with the case 10 during the accommodation, whereby leaving the draft of the case 10 is no problem. Therefore, a casting surface may remain on the inner peripheral surface 11a. As described above, according to the cooling structure of the present invention, the structure is simplified, and the labor for the processing can be reduced, whereby a production cost can be reduced. Since the inner peripheral wall 11a and the shrink-fitted ring 5 are not in contact with each other, the stator 3 can easily be assembled to the case 10. Accordingly, a labor for an assembling operation can be reduced.

Since the oil is directly in contact with the shrink-fitted ring 5 in the cooling structure described above, heat is easy to be transmitted to the oil from the stator 3. The heat of the stator 3 is also transmitted to the outer surface of the case 10 via the oil in the cooling jacket 14. The oil flown out of the respective cutout portions 8 and 9 is thrown on the coil end 4a of each split core 4 to cool the coil end 4a. Therefore, according to the cooling structure described above, the cooling efficiency of the stator 3 can be enhanced.

The present invention is not limited to the above-described embodiment, and may be embodied in various forms. For example, in the above-described embodiment, the cutout portion is provided on the cylindrical portion of the shrink-fitted ring so as to feed the oil to the coil end. However, the cutout portion may not be provided on the cylindrical portion, but a recessed portion may be provided on the highest part of the second wall face so as to feed the oil to the coil end.

The inner diameter of the inner peripheral wall of the accommodating portion may not be gradually reduced from one end to the other end in the axial direction. For example, the inner peripheral wall may have the same inner diameter in the axial direction.

The rotating electrical machine to which the cooling structure according to the present invention is applied is not limited to the one mounted to a vehicle as a traveling power source. The present invention is applicable to various rotating electrical machines, each of which has a stator that includes plural split cores and a shrink-fitted ring to integrate the split cores, and is accommodated in a case.

The invention claimed is:
1. A cooling structure of a rotating electrical machine, comprising:

a rotating electrical machine that includes a stator, the stator having plural split cores annularly combined, and a fastening member mounted to the outer periphery of the plural split cores for integrating the plural split cores, and a case that accommodates the rotating electrical machine therein, wherein the fastening member includes a cylindrical portion, and a flange portion that is provided to all over circumference at one end of the cylindrical portion in an axial direction and that extends outward in a radial direction from the cylindrical portion, the case includes an accommodating portion which has an inner peripheral wall whose inner diameter is larger than the outer diameter of the cylindrical portion and smaller than the outer diameter of the flange portion, and in which the stator is accommodated such that the inner peripheral wall and an outer peripheral surface of the cylindrical portion oppose to each other, a first wall face extending outward in the radial direction from the end of the inner peripheral wall where the flange portion is arranged, the flange portion being mounted to the first wall face, and a second wall face extending inward in the radial direction from the end of the inner peripheral wall where the other end of the cylindrical portion in the axial direction is arranged, the other end of the cylindrical portion being in contact with the second wall face, and a cooling jacket is formed by the inner peripheral wall of the accommodating portion, the outer peripheral surface of the cylindrical portion, the flange portion, and the second wall face, between the case and the stator, and a cooling liquid is fed to the cooling jacket.

2. The cooling structure of the rotating electrical machine according to claim 1, wherein the cooling liquid is an oil, and the cooling jacket is provided with a feed path for feeding the oil inside to a coil end of the split core of the stator.

3. The cooling structure of the rotating electrical machine according to claim 2, wherein the feed path is provided by cutting a part of a portion of the flange portion, the part being positioned above the coil end that is the subject to which the oil should be fed.

\* \* \* \* \*